ROBBINS & MORRISON.
Mole Plow.
No. 23,609.  Patented Apr. 12, 1859.
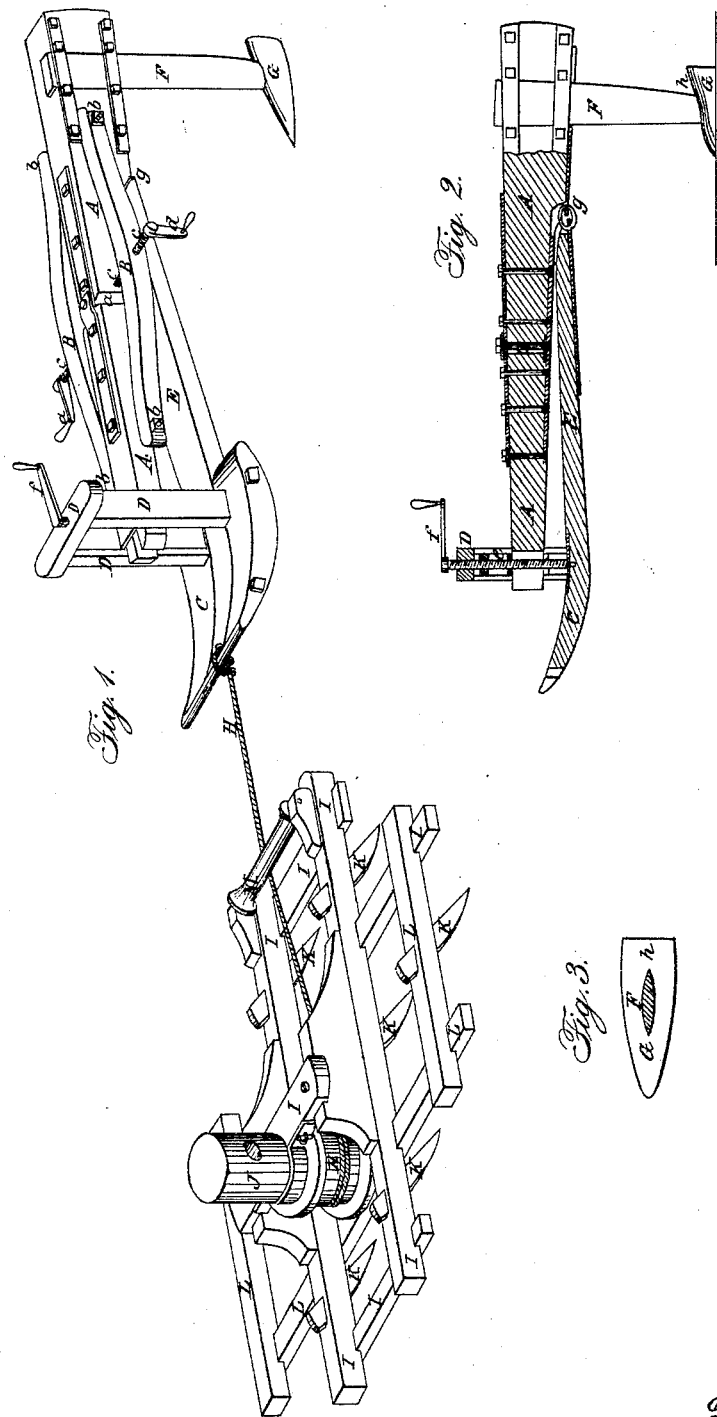
Witnesses:
Milton G. Judd
A. H. Packer
Inventor:
D. F. Robbins
Simeon Morrison

UNITED STATES PATENT OFFICE.

D. F. ROBBINS AND SIMEON MORRISON, OF DE WITT P. O., ILLINOIS.

IMPROVEMENT IN MOLE-PLOWS.

Specification forming part of Letters Patent No. 23,609, dated April 12, 1859.

*To all whom it may concern:*

Be it known that we, D. F. ROBBINS and SIMEON MORRISON, of De Witt, in the county of DeWitt and State of Illinois, have invented certain new and useful Improvements in Underground Drain-Plows, called "Mole-Plows;" and we do hereby declare the following to be a full, clear, and exact description of the construction and operation of the same, reference being had to the accompanying drawings, making a part of this specification, in which—

Figure 1 represents a perspective view of the plow, crab, and capstan as arranged for working. Fig. 2 represents a vertical longitudinal section through the plow-frame, and Fig. 3 represents a cross-section through the share or shank that carries the mole or former.

Similar letters of reference, where they occur, denote like parts in all the figures.

Our invention relates to the manner of forming the plow-beam and uniting thereto the sledge and drag bar by which the plow is directed and managed, so as to bring the whole contrivance within the easy management of the operator.

To enable others skilled in the art to make and use my invention, I will proceed to describe the same with reference to the drawings.

The beam A is made in two pieces united together by a hinge-joint, $a$, that admits of the two parts moving horizontally in either direction; but this hinged joint is controlled by two bowed braces, B B, crossing the joint and bolted to the two parts of the beams at $b\ b\ b\ b$; and through these braces B and into the beam pass two screw-shafts, $c\ c$, furnished with cranks $d\ d$ for the purpose of changing the direction of the beam, and consequently of the plow, to avoid obstructions or to change the line of the ditch.

Instead of two screw-shafts, a single one may be used having a right and left thread on it, and can be operated from one side of the plow.

C is a sledge or drag, on which a frame, D, is erected. The front or point of the beam passes between the uprights of the frame D, and is raised or lowered therein by a screw-rod, $e$, having a winch, $f$, upon it. To this drag C is firmly attached a drag-bar, E, which extends rearward, and is united at $g$ to the beam A by a hinged joint, so that the raising or lowering of the beam will not effect the drag or drag-bar, but leave the former always upon the ground.

The colter, cutter, or shank F, that carries the mole or ditch former, is rigidly secured to the beam. It front edge is sharp to readily pass through the earth, and its rear edge is rounded off, as seen in Fig. 3, so as to pass through without the friction it would have if made wedge-shaped, or its rear edge the thickest. The mole G is so attached to the cutter F as that its rear portion shall be behind the cutter and slightly enlarged there, as shown at $h$, for the purpose of closing and smoothing the cut made by the colter or shank F.

The chain or rope H, by which the plow is drawn, is fastened to the front of the sledge or drag C, and as the sledge is connected to the beam A far rearward and by means of a hinged joint, as at $g$, the point of the beam can be raised or lowered at pleasure without affecting the drag, which runs over the ground, and by thus keeping close to the surface it steadies the plow and makes its action more certain.

The crab or anchor is composed of a frame, I, upon which the capstan J is mounted, and this frame is provided with inclined flukes K, which take into the earth and hold the crab while the plow is drawn toward it. It is not only necessary to make this crab resist the power required to draw the plow toward it, but it must have such other elements within itself as will keep it firm against the action of the beam that works the capstan, as any sudden jerking, balking, or twisting of the team will upset and throw out the crab, this being particularly the case with cattle. To avoid this we put on lateral frames L, with flukes, to give the whole frame the necessary lateral support against the uneven drawing of the beam. To carry these lateral frames the entire length of the main crab-frame would make the thing inconvenient to load or carry on a wagon; but as we construct it with short sides it is readily so carried, as the lateral projections of the frame may lie between the wheels of a wagon. M is a roller to keep down the rope or chain H close to the ground, so that the team that works the capstan may easily step over it—a matter of some moment when using oxen, as they are averse to stepping over an object of any height.

Having thus fully described the nature and object of our invention, what we claim therein as new, and desire to secure by Letters Patent, is—

1. Making the beam of a mole-plow in two parts, united by a horizontal joint, to give it lateral adjustment, substantially as herein described.

2. Connecting the drag (which supports and upon which the point of the beam is made adjustable vertically) to the rear portion of the beam by a hinged joint or connection, so that the raising or lowering of the point of the plow-beam shall not affect the drag, substantially as described.

D. F. ROBBINS.
SIMEON MORRISON.

Witnesses:
MILTON Y. JUDD,
A. H. PARKER.